United States Patent
Qian et al.

(10) Patent No.: US 11,902,409 B2
(45) Date of Patent: Feb. 13, 2024

(54) FREQUENCY OFFSET ESTIMATION METHOD, DEVICE, COMMUNICATION DEVICE AND STORAGE MEDIUM

(71) Applicants: Chengdu Coresat Technology Co., Ltd, Sichuan (CN); Wuxi Coresat Technology Co., Ltd, Suzhou (CN)

(72) Inventors: Bin Qian, Sichuan (CN); Bo Liu, Sichuan (CN)

(73) Assignees: CHENGDU CORESAT TECHNOLOGY CO., LTD, Sichuan (CN); WUXI CORESAT TECHNOLOGY CO., LTD, Jiangsu (CN)

( * ) Notice: Subject to any disclaimer, the term of this patent is extended or adjusted under 35 U.S.C. 154(b) by 88 days.

(21) Appl. No.: 17/733,501

(22) Filed: Apr. 29, 2022

(65) Prior Publication Data
US 2022/0376883 A1    Nov. 24, 2022

(30) Foreign Application Priority Data

Apr. 29, 2021 (CN) .......................... 202110469871.8

(51) Int. Cl.
*H04L 7/00*    (2006.01)
*H04L 27/00*   (2006.01)

(52) U.S. Cl.
CPC .......... *H04L 7/007* (2013.01); *H04L 27/0014* (2013.01); *H04L 2027/0026* (2013.01)

(58) Field of Classification Search
CPC .............................. H04L 7/007; H04L 27/0014
See application file for complete search history.

(56) References Cited

U.S. PATENT DOCUMENTS

| 6,489,923 B1 | 12/2002 | Bevan et al. |
| 2008/0117953 A1 | 5/2008 | Chuang et al. |
| 2013/0170590 A1* | 7/2013 | Hyll .................... H04L 25/0204 |

FOREIGN PATENT DOCUMENTS

| CN | 101083647 A | 12/2007 |
| CN | 102209052 A | 10/2011 |

(Continued)

OTHER PUBLICATIONS

Duan Zhengbing, Research on Random Access Sequence Design and Detection Algorithm in LTE-based Satellite Communication, Jun. 2017, p. 1-61, Xidian University.

(Continued)

*Primary Examiner* — Ronald B Abelson
(74) *Attorney, Agent, or Firm* — IP & T GROUP LLP

(57) ABSTRACT

A frequency offset estimation method, device, communication device and storage medium are provided. The method comprises: acquiring a main peak and a secondary peak of a PRACH signal when detecting that an access signal is in the PRACH signal sent by the signal sending end, wherein the PRACH signal is composed of a preset number of identical leader sequences; determining a first frequency offset according to a peak value of the main peak and a peak value of the secondary peak; performing a frequency offset compensation on the PRACH signal according to the first frequency offset, to obtain a compensation sequence after the frequency offset compensation; and calculating a frequency offset between the compensation sequence and the leader sequences, to obtain a second frequency offset, so as to estimate a time delay of the access signal according to the second frequency offset.

6 Claims, 14 Drawing Sheets

(56) References Cited

FOREIGN PATENT DOCUMENTS

| CN | 103584944 A | 2/2014 |
| CN | 105306127 A | 2/2016 |
| CN | 107315186 A | 11/2017 |
| CN | 109660478 A | 4/2019 |
| CN | 110261821 A | 9/2019 |
| CN | 111565448 A | 8/2020 |
| CN | 112803992 A | 5/2021 |

OTHER PUBLICATIONS

The First Office Action of Priority Application No. CN 202110469871.8 issued by the Chinese Patent Office dated Jun. 7, 2021.
Notification to Grant Patent Right for Invention of Priority Application No. CN 202110469871.8 issued by the Chinese Patent Office dated Jun. 25, 2021.
First search of priority document 202110469871.8.
Supplementary search of priority document 202110469871.8.

* cited by examiner

FREQUENCY OFFSET ESTIMATION METHOD, DEVICE, COMMUNICATION DEVICE AND STORAGE MEDIUM

CROSS-REFERENCE TO RELATED APPLICATION

The present disclosure claims the priority to the Chinese patent application with the filing No. 202110469871.8, filed on Apr. 29, 2021 with the Chinese Patent Office and entitled "Frequency Offset Estimation Method, Device, Communication Device and Storage Medium", the contents of which are incorporated by reference herein in entirety.

TECHNICAL FIELD

The present application relates to the field of communication technology, and in particular, to a frequency offset estimation method, device, communication device and storage medium.

BACKGROUND ART

The PRACH signal of LTE/NR is generated based on the discrete Fourier transformation of the leader sequence. The ZC sequence, which has been self-correlated, is usually used as the leader sequence, but the correlation peak of the ZC sequence which has been self-correlated is easily affected by the frequency offset, thereby affecting the estimation of the time delay, which will ultimately affect the correct processing of the PRACH signal.

In the prior art, in order to avoid the frequency offset from affecting the time delay estimation, the method of a restriction set is usually adopted, that is, a restriction set suitable for specific application scenarios is constructed to ensure that the time delay estimation is not affected by the spectral peak shift, which is caused by the frequency offset of 1-fold subcarrier interval. However, this technology is only limited to the application scenario where the frequency offset is within 1-fold subcarrier, which has great limitation.

SUMMARY

The objective of the present application is to provide a frequency offset estimation method, device, communication device, and storage medium, which can be free from the limitation of the size of the frequency offset, and the frequency offset of any size can be accurately estimated, so as to perform the time delay estimation according to the frequency offset estimation result, which expands the range of application scenarios.

In order to achieve the above objectives, the technical solutions adopted by the present application are as follows.

In the first aspect, the present application provides a frequency offset estimation method, applicable to a signal receiving end, wherein the signal receiving end is in communication with a signal sending end, and the method comprises steps of: acquiring a main peak and a secondary peak of a PRACH signal when detecting that an access signal is in the PRACH signal sent by the signal sending end, wherein the PRACH signal is composed of a preset number of identical leader sequences; determining a first frequency offset according to a peak value of the main peak and a peak value of the secondary peak; performing a frequency offset compensation on the PRACH signal according to the first frequency offset, to obtain a compensation sequence after the frequency offset compensation; and calculating a frequency offset between the compensation sequence and the leader sequences, to obtain a second frequency offset, so as to estimate a time delay of the access signal according to the second frequency offset.

In the second aspect, the present application provides a frequency offset estimation device, applicable to a signal receiving end, wherein the signal receiving end is in communication with a signal sending end, and the device comprises: an acquisition module, configured to acquire a main peak and a secondary peak of a PRACH signal when detecting that an access signal is in the PRACH signal sent by the signal sending end, wherein the PRACH signal is composed of a preset number of identical leader sequences; a first determination module, configured to determine a first frequency offset according to a peak value of the main peak and a peak value of the secondary peak; a compensation module, configured to perform a frequency offset compensation on the PRACH signal according to the first frequency offset, to obtain a compensation sequence after the frequency offset compensation; a second determination module, configured to calculate a frequency offset between the compensation sequence and the leader sequences, to obtain a second frequency offset, so as to estimate a time delay of the access signal according to the second frequency offset.

In the third aspect, the present application provides a communication device, comprising a memory and a processor, wherein the memory stores computer programs, and the processor implements the frequency offset estimation method mentioned above when executing the computer programs.

In the fourth aspect, the present application provides a computer readable storage medium, having computer programs stored thereon, wherein the computer programs implement the frequency offset estimation method mentioned above when the computer programs are executed by a processor.

Compared with the prior art, through firstly determining the first frequency offset according to the peak value of the main peak and the peak value of the secondary peak, and then performing the frequency offset compensation on the received PRACH signal according to the first frequency offset to obtain the compensation sequence, and finally calculating the frequency offset between the compensation sequence and the leader sequences to obtain the second frequency offset, the present application can achieve the accurate estimation of frequency offsets of any size, so as to estimate the time delay according to the frequency offset estimation result, which expands the range of application scenarios.

BRIEF DESCRIPTION OF DRAWINGS

In order to explain the technical solutions of the embodiments of the present application more clearly, the drawings needed to be used in the embodiments will be briefly introduced as follows. It should be understood that the following drawings only show certain embodiments of the present application, and therefore should be regarded as limitation on the scope. For those skilled in the art, without creative work, other related drawings can be obtained based on these drawings.

Figure 1:
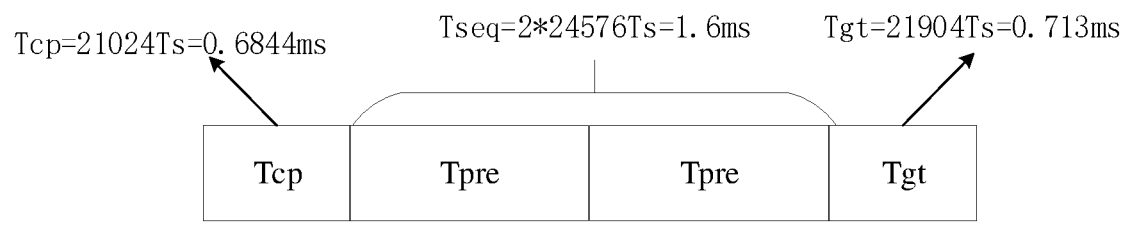
FIG. 1 is an exemplary diagram of the NR PRACH channel format in the prior art, provided by an embodiment of the present application.

Reference Number: 10-communication device; 11-processor; 12-memory; 13-bus; 14-communication interface; 100-frequency offset estimation device; 110-acquisition module; 120-first determination module; 130-compensation module; 140-second determination module; 150-estimation module.

DETAILED DESCRIPTION OF EMBODIMENTS

In order to make the objectives, technical solutions, and advantages of the embodiments of the present application clearer, the technical solutions in the embodiments of the present application will be described clearly and completely in conjunction with the drawings in the embodiments of the present application. Obviously, the described embodiments are part of the embodiments of the present application, but not all of the embodiments. Generally, the components in the embodiments of the present application described and illustrated in the drawings herein may be arranged and designed in various different configurations.

Therefore, the following detailed description of the embodiments of the present application provided in the drawings is not intended to limit the scope of the claimed application, but merely involves the selected embodiments of the present application. Based on the embodiments of the present application, all other embodiments, which are obtained by those skilled in the art without creative work, shall fall within the protection scope of the present application.

It should be noted that similar reference numbers and letters indicate similar items in the following drawings. Therefore, once a certain item is defined in one drawing, it does not need to be further defined and explained in the subsequent drawings.

In the description of the present application, it should be noted that if the orientation or position relationship, indicated by the terms "upper", "lower", "inner", "outer" etc., appears, it is based on the orientation or position relationship shown in the drawings, or the orientation or position relationship in which the product of the application is usually placed in use, which is only for the convenience of describing the present application and simplifying the description, rather than indicating or implying that the device or element referred to must be in the specific orientation, or constructed and operated in the specific orientation. Therefore, it cannot be understood as limiting the present application.

In addition, if the terms, "first", "second", etc., appear, they are only used for distinguishing the description, and cannot be understood as indicating or implying the importance in relativity.

It should be noted that in the case of no conflict, the features in the embodiments of the present application can be combined with each other.

In the prior art, the PRACH (Physical Random Access Channel) signal used in the random access channel of the Long Term Evolution (LTE) technology or the New Radio (NR) technology is composed of the cyclic prefix (CP) and the leader sequence, followed by the Guard Time (GT), which is used to protect the random access signal from falling into the same detection window after a delay. The difference between the length of the PRACH signal and the length of the detection window is the guard time. FIG. 1 is an exemplary diagram of the NR PRACH channel format in the prior art, provided by an embodiment of the present application.

It should be noted that the 38.211 protocol adopted by LTE/NR specifies 5 formats of PRACH parameters (cyclic prefix length, leader sequence length, and GT length), to adapt to different coverage requirements. FIG. 1 is just an example of one format.

Because the cell radius of the terrestrial communication system is small relatively, the time delay and the frequency offset are usually not too large. In this case, ensuring that the user delay is within the protection of the CP does not need too long CP and GT lengths. In addition, since the ZC sequence has better self-correlation and cross-correlation characteristics, the leader sequences of LTE/NR are each a ZC sequence. Although the ZC sequence has good self-correlation, the correlation peak of the self-correlation is easily affected by the frequency offset. When there is the frequency offset of the fractional folds of subcarrier intervals (that is, the frequency offset is relatively small), the main peak of the correlation peak decreases, and the secondary peak increases, which will cause the detection of the access signal to fail; and when there is the frequency offset of integral fold of subcarrier interval (that is, the frequency offset is relatively large), the main peak of the correlation peak will shift, resulting in the failure of the timing of the signal.

Figure 2:
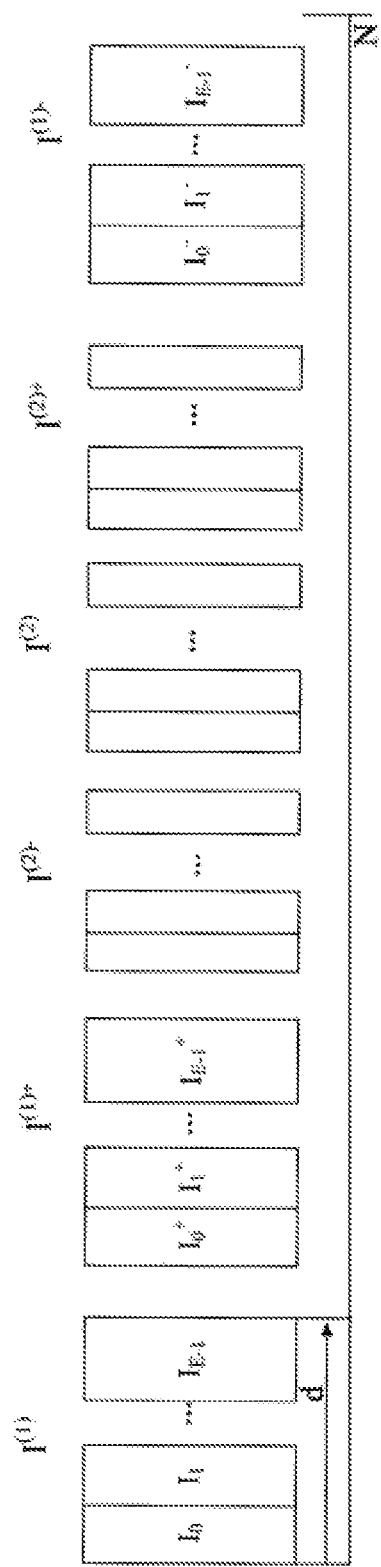
FIG. 2 is an exemplary diagram of a PRACH restriction set A of an NR system provided by an embodiment of the present application.

In application scenarios with small frequency offset and small time delay, such as, high-speed railway application scenarios, in the access of base stations of the high speed railway, the Doppler frequency offset caused by the speed of the high-speed railway is within positive or negative 1-fold subcarrier interval. In the prior art, usually the restriction set method is used to ensure that the spectral peak shift caused by the frequency offset of 1-fold subcarrier interval will not affect the time delay estimation. Taking the NR restriction set A as the example, the upper layer allocates the PRACH access capability of a certain cell through the parameter, zeroCorrelationZoneConfig, wherein the zeroCorrelationZoneConfig parameter is mapped to Table 6.3.3.1-5 and Table 6.3.3.1-6 in the 211 protocol to obtain the $N_{CS}$ value. The $N_{CS}$ value is the size of the displacement interval for distinguishing between two different PRACH leader sequences on the same root sequence. If being within the $N^{CS}$ value range in a single root sequence, it is the Zero Correlation Zone (ZCZ). In this zone, there is the peak value of only one leader sequence. When constructing a high-speed access restriction set, it is necessary to ensure that the main peak or two secondary peaks of other leader sequence will not fall within this zone. Referring to FIG. 2, FIG. 2 is an exemplary diagram of a PRACH restriction set A of an NR system provided by an embodiment of the present application. In FIG. 2, d indicates the value of the main peak offset caused by the frequency offset of 1-fold subcarrier interval, and N indicates the length of the ZC sequence. $I_m$(m=0 . . . E−1) indicates the E access windows allocated in d, the superscript "+" indicates the position of the spectral peak after the shift caused by the positive one-fold frequency offset, and the superscript "−" indicates the position of the spectral peak after the shift caused by the negative one-fold frequency offset. $I^{(1)}$ represents the position which is allocated by the first packet avocation, and $I^{(2)}$ represents the position which is allocated by the second packet allocation, the both being ensured not to overlap each other. $I^{(n)}$, n>1 is another group of access resources, which is obtained by extending $I^{(1)}$ for the system maximization. The specific maximum number of groups is determined by the base station calculating based on the value of d, with the maximum number of groups=N/(3d). When the user sends a PRACH signal, one group is randomly selected from the above resources, and one window (for example, in $I_1$) in $I_m$(m=0 . . . E−1) is randomly selected in the one group, to be sent. At the receiving end of the base station, the maximum peak of the user's random access signal may appear in any one of the three ranges, $I^{(1)}$, $I^{(1)+}$ or $I^{(1)-}$. For example, the maximum peak of the user appears in the window $I_1^{30}$, which means that the frequency offset of the user is close to the positive one-fold subcarrier interval. The maximum peak appears in the window $I_1$, which means that the user's frequency offset is close to zero-fold subcarrier interval. The maximum peak appears in the window $I_1^-$, which means that the user's frequency offset is close to negative one-fold subcarrier interval. When the NR base station detects that a user accesses, the peak detection uses the three-peak combination method, which combines the peaks in the three zones of $I_1$, $I_1^+$ and $I_1^-$. In this way, the access signal can be detected regardless of whether the maximum peak caused by the frequency offset is in $I_1$, $I_1^+$ or $I_1^-$. At the same time, the subtraction operation is performed on the peak position and the starting point of the window $I_1$, $I_1^+$ or $I_1^-$, to obtain the time delay of the access signal.

However, in application scenarios with relatively large time delays and frequency offsets, such as low-orbit satellite systems, satellite-to-ground transmission has the time delay which is very huge, and the cell coverage radius is also larger than that of ground systems. On the one hand, the traditional PRACH channel format cannot satisfy requirements of the base station for user timing. If the CP length is greater than the transmission time delay in the adopted design, the leader length is too large, and the too large leader length causes that the frequency interval between the leader subcarriers is too small, and it is easily affected by the frequency offset, resulting in that the detection is failed or the timing is inaccurate. On the other hand, first of all, it is difficult for the low-orbit satellite system to ensure that the frequency offset of the user's access signal can be limited within one-fold subcarrier interval. Otherwise, the frequency offset compensation at the ground end will be too complicated, and especially in the case that there is no ephemeris information or the ephemeris information is out of date for a long time, it is no longer possible to compensate for the motion frequency offset on the ground. If the frequency offset is too large, the main peak value of the correlation peak will exceed the preset range of the restriction set, which will cause the detection to fail. Secondly, according to the design principle of the restriction set, the influence of the offset caused by the one-fold frequency offset can be solved by the restriction set, but the prerequisite is that the time delay of the access signal cannot be too large, and it needs to be limited within $N_{CS}$. If the time delay of the signal access is greater than the leader length, and the method of the restriction set is no longer applicable. Finally, the larger the frequency offset is, the more the intervals it needs to avoid is, and the more complicated the design of the restriction set is. Generally, after the frequency offset is greater than 2 folds of the subcarrier interval, and is folds of the subcarrier interval with the number of the folds being an integer, the restriction set can no longer be designed.

Figure 3:
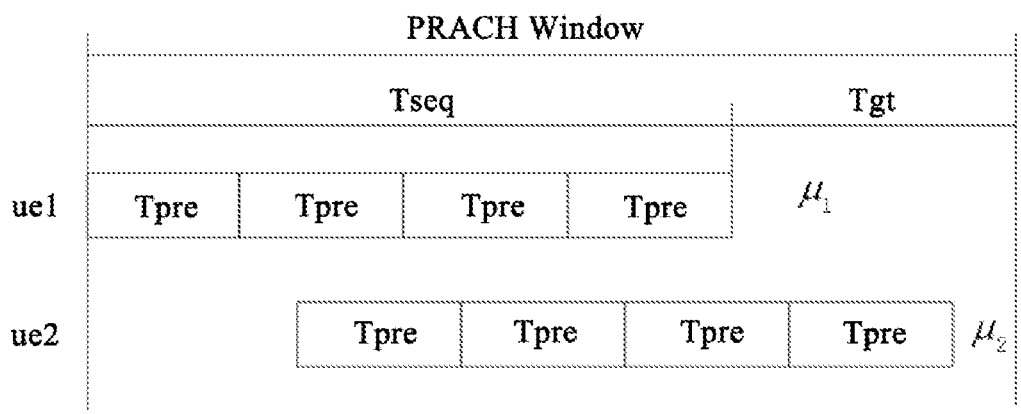
FIG. 3 is an exemplary diagram of an improved PRACH channel format provided by an embodiment of the present application.

Through the analysis of the existing technology and its application scenarios, as well as the research on the characteristics of the application scenarios with the relatively large time delay and frequency offset, the inventors firstly proposed a new PRACH signal format. Since the new PRACH channel format no longer includes CP and GT, the leader sequence is no longer restricted by the contradiction between the transmission time delay and the size of the subcarrier interval, which can support the application scenarios with greater time delay and frequency offset. Referring to FIG. 3, FIG. 3 is an exemplary diagram of the new PRACH channel format provided by an embodiment of the present application. In FIG. 3, the new PRACH signal is composed of a preset number of identical leader sequences, and no longer includes CP and GT.

Secondly, based on the new PRACH channel format, the inventors also provide a frequency offset estimation method applicable to the signal receiving end, so as to estimate the frequency offset of the received new PRACH channel format. The frequency offset estimation method is not limited by the frequency offset and the time delay, capable of being applied to application scenarios with the small frequency offset and time delay, and also the application scenarios with the large frequency offset and time delay as well, which will be described in detail below.

Figure 4:
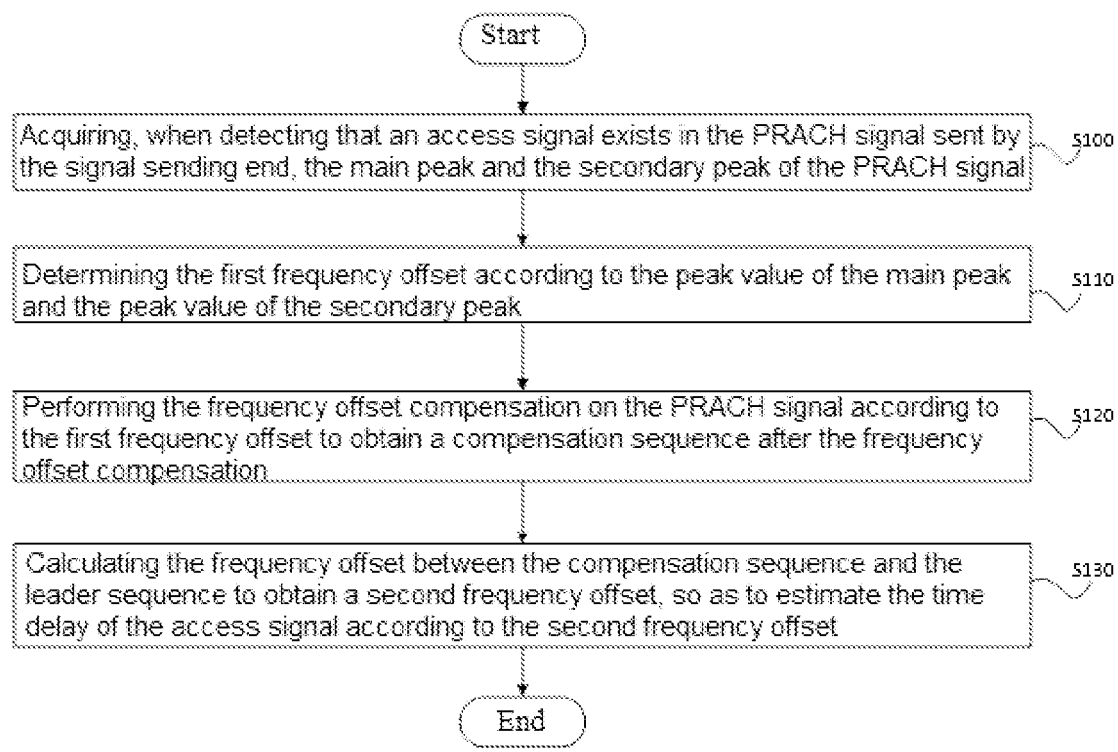
FIG. 4 is an exemplary diagram of a flow of a frequency offset estimation method provided by an embodiment of the present application.

Referring to FIG. 4, FIG. 4 is an exemplary diagram of a flow of a frequency offset estimation method provided by an embodiment of the present application. The method comprises the following steps:

Step S100: acquiring, when detecting that an access signal exists in the PRACH signal sent by the signal sending end, the main peak and the secondary peak of the PRACH signal, wherein the PRACH signal is composed of a preset number of identical leader sequences.

In this embodiment, the preset number is predetermined according to the signal-to-noise ratio of the received signal in the actual application scenario and the coverage status of the satellite cell. The leader sequence may be obtained by generating a ZC sequence according to the preset root value, and then performing the time-domain/frequency-domain conversion on the ZC sequence.

In this embodiment, when the frequency offset and the time delay of the application scenario are relatively small, the detection method, which is configured in the LTE/NR restriction set mode in the prior art, can be used to detect the access signal. In this method, there are three restriction windows. $I_i$, $I_i^+$, $I_i^-$ (i=0 . . . E−1) in FIG. 2, respectively corresponding to the frequency offset of 0 fold of the subcarrier interval and the frequency offsets of the positive 1 fold and negative 1 fold of the subcarrier interval. During the detection, whether there is the access signal is determined by using the combination of the correlation values in these three ranges.

When the frequency offset and the time delay of the application scenario are relatively large, for example, in the low-orbit satellite system, the subcarrier interval of the random access signal and the frequency offset of the signal access have a contradiction problem therebetween, and it is difficult to ensure that the frequency offset of the signal access can be limited within one-fold subcarrier interval, and otherwise, the frequency offset compensation at the ground end will be too complicated. Especially in the case that there is no ephemeris information or the ephemeris information is out of date for a long time, it is no longer possible to compensate for the frequency offset caused by motion, on the ground. If the frequency offset is too large, it exceeds the three ranges (regions) specified by LTE/NR, the detection fails. For this scenario, a detection method which can be used is: firstly searching for the main peak value, then searching for the two secondary peaks, left and right, according to the law that the integral folds of frequency offset leads to the peak shift, and then using the combination of the three peaks to determine whether there is signal access. Of course, it is also possible to combine the three peaks firstly, and then search for the main peak. Since not necessary to pre-assume which range the peak is located within, this detection method allows to search for the peak over the entire leader length, so that there is no longer a restriction on the searching range for a larger frequency offset and a larger time delay. The above method is also suitable for the application scenarios with smaller frequency offset and smaller time delay.

For ease of description, the embodiment of the present application also provides a derivation process of the formula for determining the main peak and the secondary peak.

The signal r(n) received by the base station is the superposition of the PRACH signal s(n) sent by the user, with the superposition being performed through channel, frequency offset and noise.

$$r(n) = e^{j\frac{2\pi\Delta\varepsilon n}{N}} \times h \times s_{\mu'}(n-\kappa) + w(n)$$

where, h is the channel coefficient. Since the symbol period selected by the random access signal is much larger than the multipath time delay, h is a constant value. The channel coefficient h can be ignored in the subsequent derivation, κ is the user time delay, Δε is the frequency offset of the signal, $\Delta\varepsilon=\Delta f/f_s$, where $f_s$ is the sampling rate, Δf is the frequency offset, w(n) is the noise with the mean value of 0 and the variance of $\sigma^2$, $s_{\mu'}$ is the time domain signal of the sent signal, $$s_{\mu'}(n) = \frac{1}{\sqrt{N}}\sum_{k=0}^{N-1} ZC_\mu(k) \times e^{j\frac{2\pi nk}{N}},$$

$ZC_\mu(k)$ is the ZC sequence wherein the user's frequency domain sending data is the root value which is μ, μ is the root value, and k represents the index value of the ZC sequence, N represents the length of the time domain sequence, and n represents the index of the time domain sequence, μ' is dual to the root value μ. Suppose, ignoring the time delay κ the sending signal $s_{\mu'}(n)$ is substituted into it to obtain:

$$r(n) = e^{j\frac{2\pi\Delta\varepsilon n}{N}} \times A \times e^{j\pi\rho n(\mu'n-1)} \times e^{-j\frac{\pi n(1+\mu')}{N}} \times zc_{\mu'}^*(n) + w(n)$$

where ρ represents a preset positive integer, $$A = \frac{1}{\sqrt{N}}\left[\sum_{k=0}^{N-1} ZC_\mu(k)\right],$$

and j is the imaginary part indicator, $j^2=-1$.

After the received signal is obtained, FFT operation is required to be operated to obtain N valid data values in the frequency domain resources corresponding to PRACH, through the subcarrier de-mapping. Assuming that the influences of frequency offset, time delay and channel are not considered, the value Y(k) on the k-th subcarrier is as follows.

$$Y(k)=FFT[r(n)]=ZC_\mu(k)+W(k)$$

where W(k) is the fast Fourier transformation of w(n). At the receiving end, the data after FFT and the local reference signal are subject to the conjugate multiplication, and then IDFT is performed, so as to form a time-domain correlation sequence R(m), and the frequency-domain calculation method of R(m) can be proven.

$$R(m)=IDFT[Y(k)ZC_\mu^*(k)]$$

where $ZC_\mu^*(k)$ is the conjugate of $ZC_\mu(k)$.

The equivalent time domain calculation formula is as follows.

$$R(m) = \sum_{n=0}^{N-1} r(n)s_{\mu'}^*(n-m)$$

In the above formula, m is the difference between the reference sequence and the received sequence, and $s_{\mu'}^*$ is the conjugate of $s_{\mu'}$. Assuming that the time delay κ is ignored and only the frequency offset Δf is considered, the correlation sequence R(m, Δf) can be expressed as:

$$R(m, \Delta f) =$$

$$\sum_{n=0}^{N-1} r(n) s_{\mu'}^*(n-m) = AA_e^* e^{-j\frac{\pi m(1+\mu')}{N}} * \sum_{n=0}^{N-1} \left( e^{j[\pi\rho n(\mu'n-1) - \pi\rho(n-m)(\mu'(n-m)-1)]} \right)$$

$$e^{j\frac{2\pi n \Delta f T_{pre}}{N}} zc_{\mu'}^*(n) zc_{\mu'}(n-m) + \sum_{n=0}^{N-1} w(n) s_{\mu'}^*(n-m)$$

where $T_{pre}$ is the time length of the leader sequence. Since the variance of w(n) is a fixed value and $s_\mu(n-m)$ is a constant amplitude value, the value of $R(m,\Delta f)$ depends on the first term, and the noise term can be ignored. At the same time, in the above formula:

$$e^{j[\pi\rho n(\mu'n-1) - \pi\rho(n-m)(\mu'(n-m)-1)]} = e^{j2\pi\rho\mu' nm - \pi\rho m - \pi\rho\mu'm^2}$$

where $2\pi\rho\mu'nm$ is the integral folds of $2\pi$, and as a power of e, its value is equal to 1, and the accumulative formula proposes a term that has nothing to do with n.

$$R(m, \Delta f) = AA_e^* e^{-j\frac{\pi m(1+\mu')}{N}} e^{-j(\pi\rho m + \pi\rho\mu'm^2)} e^{j\frac{\pi\mu'(m^2-m)}{N}} \sum_{n=0}^{N-1} e^{j\frac{2\pi n(\Delta f T_{pre} - \mu'm)}{N}}$$

$$= AA_e^* e^{-j\frac{\pi m(1+\mu')}{N}} e^{-j(\pi\rho m + \pi\rho\mu'm^2)} e^{j\frac{\pi\mu'(m^2-m)}{N}} \sum_{n=0}^{N-1} e^{j\frac{2\pi n(\Delta f/f_{SCS} - \mu'm)}{N}}$$

where $f_{SCS}=1/T_{pre}$ is the subcarrier interval. In the above formula, the absolute value of $$AA_e^* e^{-j\frac{\pi m(1+\mu')}{N}} e^{-j(\pi\rho m + \pi\rho\mu'm^2)} e^{j\frac{\pi\mu'(m^2-m)}{N}}$$

is a fixed value, and the magnitude of $|R(m, \Delta f)|$ depends on the last term. When $\Delta f \neq 0$, and satisfying m in the following formula, $|R(m, \Delta f)|$ has the maximum value.

$$\Delta f/f_{SCS} - \mu'm = 0$$

Therefore, when the value of m satisfies:

$$\mathrm{mod}(\mu'm, N) = \mathrm{int}(\Delta f/f_{SCS}),$$

$|R(m, \Delta f)|$ has the maximum value and it is judged as the main peak, wherein int( ) is the rounding calculation. At the same time, the frequency offset causes the secondary peak to appear, and the secondary peak appears at m location where $\mathrm{mod}(\mu'm, N) = \mathrm{non\text{-}int}(\Delta f/f_{SCS})$, integer.

In this embodiment, detecting whether there is an access signal can be performed by calculating the PDP value of combination of the three peaks. The calculation formula of the PDP is as follows:

$$PDP(m) = |R(m,\Delta f)| + |R(\mathrm{mod}(m-\mu, N),\Delta f)| + |R(\mathrm{mod}(m+\mu, N),\Delta f)|$$

In order to more accurately determine whether there is an access signal, usually the signal receiving end usually adopts a sliding window method, comprising: sliding the window for a preset number; calculating, for the window after each sliding, the PDP value of the three-peak combination corresponding to the window, and selecting the maximum value of the PDP value therefrom, wherein if the maximum value is greater than the preset threshold, it is determined that there is an access signal.

In this embodiment, due to the frequency offset existing, the main peak value of the correlation peak will be caused to become smaller. This change is led to by the inter-subcarrier interference caused by the frequency offset.

For example, assuming that the frequency offset exceeds the range of [−0.5, +0.5] folds of the subcarrier interval, the frequency offset $\Delta\varepsilon$ can be divided into two parts, i.e., the integral olds of frequency offset $\Delta\varepsilon_I$ (that is, the second frequency offset) and fractional folds of frequency offset $\Delta\varepsilon_F$ (that is, the first frequency offset), then the received signal is:

$$r(n) = \frac{1}{\sqrt{N}} \sum_{k=0}^{N-1} \left( e^{j\frac{2\pi(\Delta\varepsilon_I + \Delta\varepsilon_F)n}{N}} \times ZC_\mu(k) \right) \times e^{j\frac{2\pi kn}{N}}$$

Fourier transformation operation is performed on the time domain signal at the receiving end.

$$Y(k') = \sum_{n=0}^{N-1} \left[ e^{j\frac{2\pi(\Delta\varepsilon_I + \Delta\varepsilon_F)n}{N}} \right] \left[ \sum_{k=0}^{N-1} ZC_\mu(k) \times e^{j\frac{2\pi kn}{N}} \right] \times e^{-j\frac{2\pi n k'}{N}},$$

$$= ZC_\mu(k' - \Delta\varepsilon_I) \sum_{n=0}^{N-1} e^{j\frac{2\pi n \Delta\varepsilon_F}{N}} +$$

$$\sum_{\substack{k=0 \\ k \neq k' - \Delta\varepsilon_I}}^{N-1} ZC_\mu(k) \left[ \sum_{n=0}^{N-1} e^{j\frac{2\pi n(k-k' + \Delta\varepsilon_I + \Delta\varepsilon_F)}{N}} \right]$$

It can be seen from the above formula that due to the existence of the frequency offset, the data after the FFT at the receiving end is no longer a simple $ZC_\mu$ sequence. The first term of the above formula corresponds to the shift of the frequency domain data position caused by the integral folds of frequency offset. The second term is inter-subcarrier interference caused by frequency offset.

Figure 5:
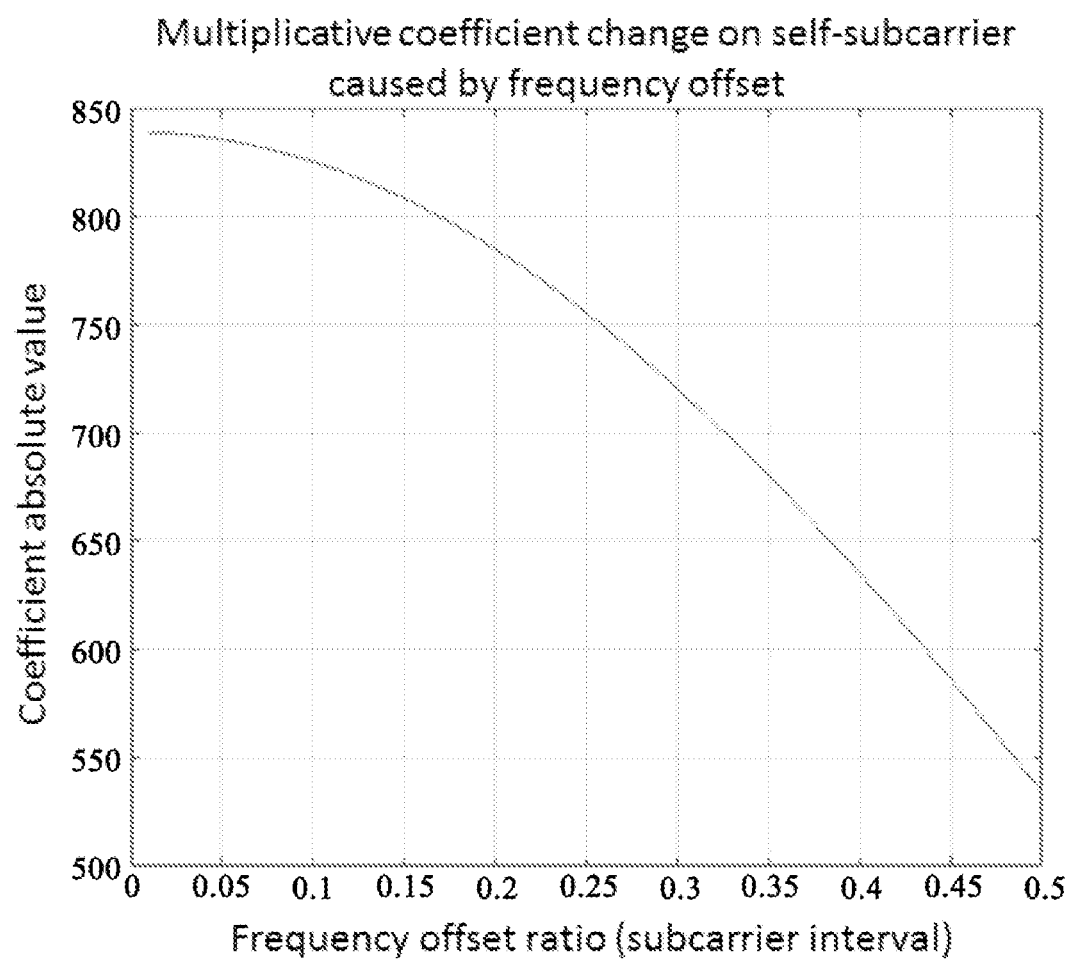
FIG. 5 is an exemplary diagram of a simulation result of influence by fractional folds of frequency offset provided by an embodiment of the present application.
Figure 6:
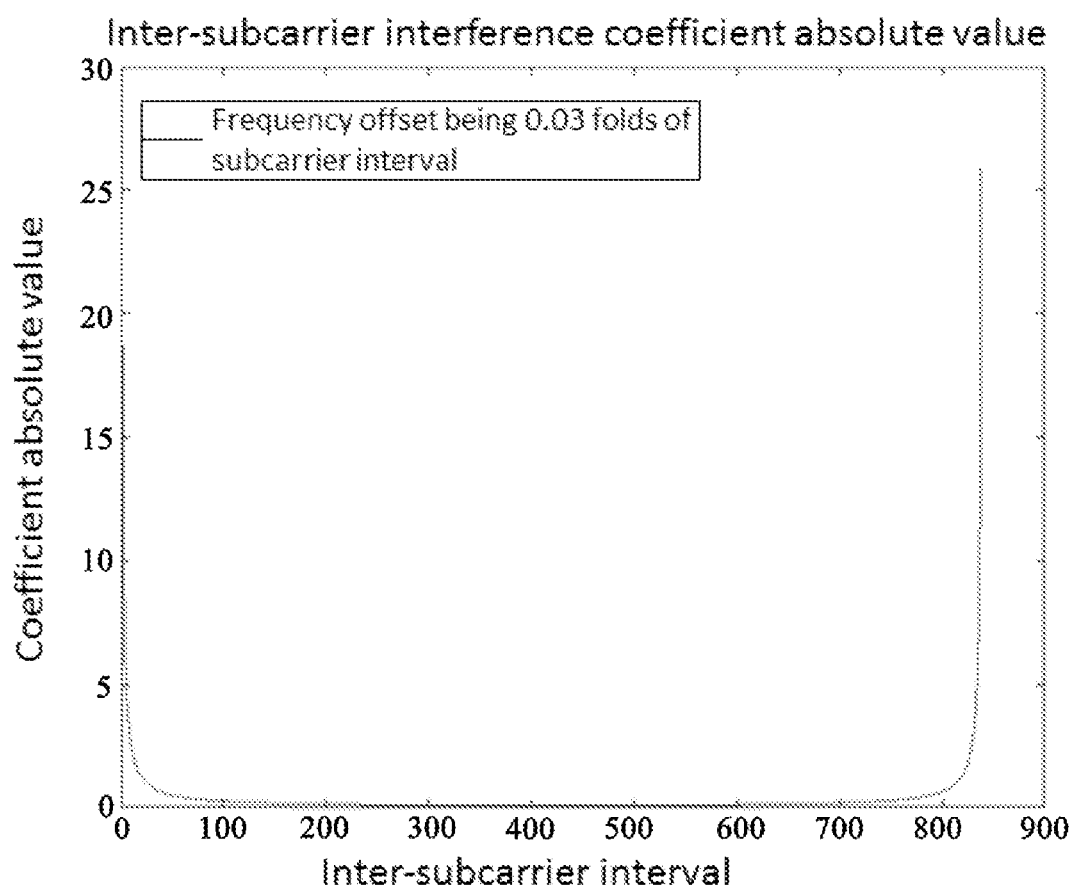
FIG. 6 is an exemplary diagram of simulation result of influence by the inter-subcarrier interference term of 0.03 folds of the frequency offset, provided by an embodiment of the present application.
Figure 7:
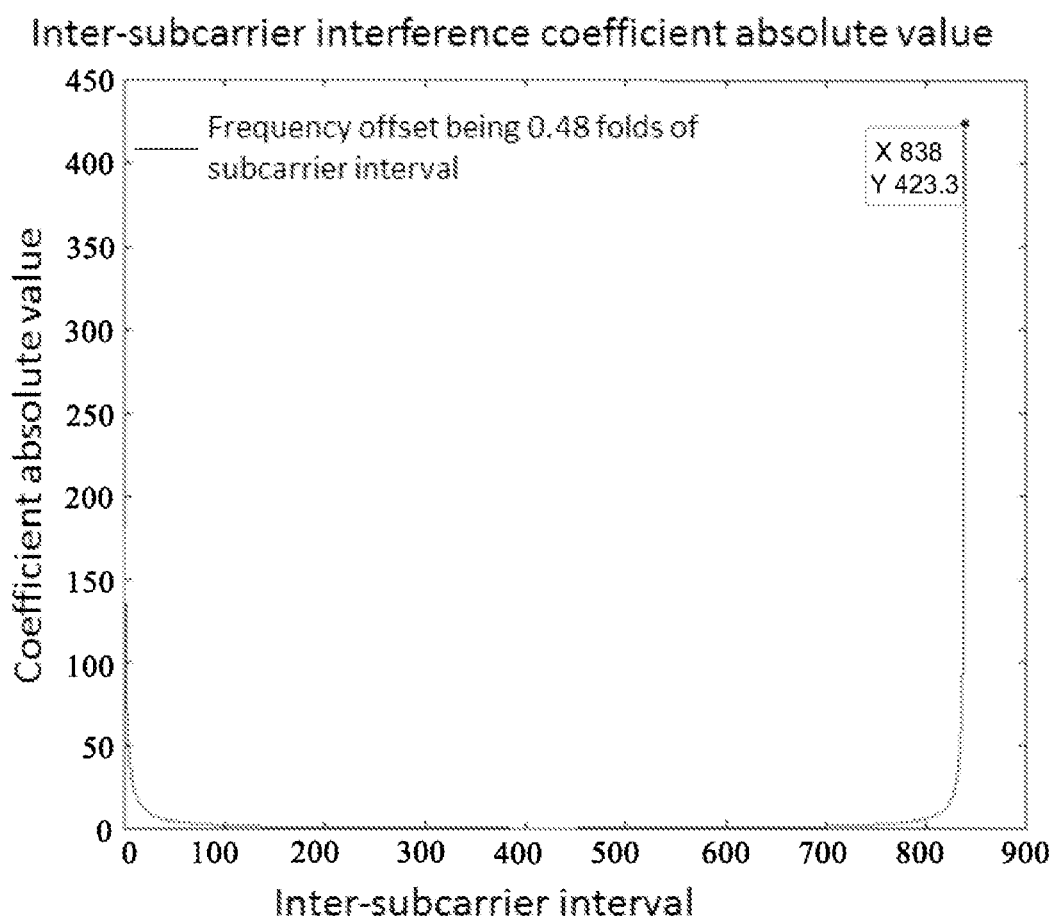
FIG. 7 is an exemplary diagram of the simulation result of influence by the inter-subcarrier interference term of 0.48 folds of the frequency offset, provided by an embodiment of the present application.

By simulating the above two items, the simulation results shown in FIG. 5, FIG. 6 and FIG. 7 are obtained. Referring to FIG. 5, FIG. 5 is an exemplary diagram of a result of influence by fractional folds of frequency offset. FIG. 5 shows the result that the coefficient of $ZC_\mu(k'-\Delta\varepsilon_I)$ is influenced by the fractional folds of frequency offset. It can be seen from FIG. 5 that when there is no fractional folds of frequency offset, the coefficient in front of the term $ZC_\mu(k'-\Delta\varepsilon_I$ is 839. After normalization, Y(k') corresponds to the value on $ZC_\mu(k'-\Delta\varepsilon_I)$ of the sending end. Along with the fractional folds of frequency offset gradually increasing, the coefficient in front of $ZC_\mu(k'-\Delta\varepsilon_I)$ becomes a complex number, and the absolute value gradually decreases.

FIG. 6 is an exemplary diagram of result of influence by the inter-subcarrier interference term of 0.03 folds of the frequency offset. FIG. 7 is an exemplary diagram of the result of influence by the inter-subcarrier interference term of 0.48 folds of the frequency offset, wherein at $k \neq k' - \varepsilon_{m,I}$, the relationships between the absolute value of the coefficients on other subcarriers $ZC_\mu(k)$, and the magnitude of the frequency offset, and between the absolute valve and the inter-subcarrier interval are shown in FIG. 6 and FIG. 7. It can be seen from FIG. 6 and FIG. 7 that the larger the fractional folds of frequency offset is, the larger the coefficient value on other subcarrier interference is; and the closer the distance of the interference on the subcarrier is, the larger the coefficient value on the subcarrier is, and the more serious the interference is.

It can be concluded from the analysis of the simulation results in FIG. 5 to FIG. 7 that the influence of the fractional folds of frequency offset must be eliminated before the integral folds of frequency offset can be correctly estimated.

Step S110: determining the first frequency offset according to the peak value of the main peak and the peak value of the secondary peak.

In this embodiment, the first frequency offset is the smaller frequency offset, that is, a frequency offset of a fractional fold of the subcarrier interval.

Step S120: performing the frequency offset compensation on the PRACH signal according to the first frequency offset to obtain a compensation sequence after the frequency offset compensation.

Step S130: calculating the frequency offset between the compensation sequence and the leader sequence to obtain a second frequency offset, so as to estimate the time delay of the access signal according to the second frequency offset.

In this embodiment, the second frequency offset is a relatively large frequency offset, that is, a frequency offset of integral folds of the subcarrier interval.

Through firstly determining the first frequency offset according to the peak value of the main peak and the peak value of the secondary peak, and then performing the frequency offset compensation on the received PRACH signal according to the first frequency offset to obtain the compensation sequence, and finally calculating the frequency offset between the compensation sequence and the leader sequences to obtain the second frequency offset, the above method provided by the embodiment of the present application can achieve the accurate estimation on frequency offsets of any size, so as to solve/resist the frequency offset of any size, to perform the time delay estimation according to the frequency offset estimation result, which expands the range of application scenarios.

Figure 8:
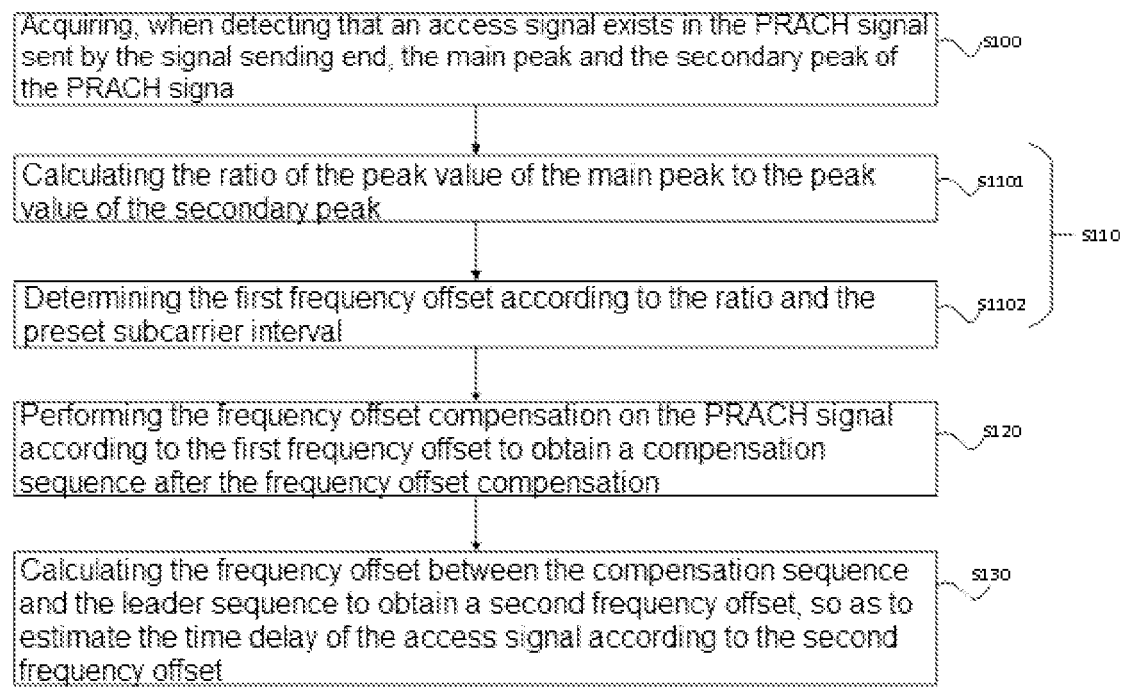
FIG. 8 is an exemplary diagram of a flow of a method for implementing determination of a first frequency offset, provided by an embodiment of the present application.

On the basis of FIG. 4, the embodiment of the present application also provides a specific implementation for determining the first frequency offset. Referring to FIG. 8, FIG. 8 FIG. 8 is an exemplary diagram of a flow of another frequency offset estimation method, provided by an embodiment of the present application. Step S110 comprises the following sub-steps.

In Sub-step S1101, the ratio of the peak value of the main peak to the peak value of the secondary peak is calculated.

In this embodiment, the correlation function affected by the frequency offset can be expressed as:

$$R(m, \Delta f) = AA_e^* e^{-j\frac{\pi m(1+\mu')}{N}} e^{-j(\pi\rho m+\pi\rho\mu' m^2)} e^{j\frac{\pi\mu'(m^2-m)}{N}} \sum_{n=0}^{N-1} e^{j\frac{2\pi n(\Delta f/f_{SCS}-\mu' m)}{N}}$$

In the above formula, the absolute value of $$AA_e^* e^{-j\frac{\pi m(1+\mu')}{N}} e^{-j(\pi\rho m+\pi\rho\mu' m^2)} e^{j\frac{\pi\mu'(m^2-m)}{N}}$$

is a fixed value, thus the absolute value of $R(m,\Delta f)$ depends on the latter item. To estimate the frequency offset, firstly the value of $|R(0, \Delta f)|^2$ at m=0 is calculated.

$$R(0, \Delta f) = B \sum_{n=0}^{N-1} e^{j\frac{2\pi n\Delta f/f_{SCS}}{N}}$$

wherein $$B = AA_e^* e^{-j\frac{\pi m(1+\mu')}{N}} e^{-j(\pi\rho m+\pi\rho\mu' m^2)} e^{j\frac{\pi\mu'(m^2-m)}{N}}$$

assuming $\gamma=\Delta f/f_{SCS}$, then $$|R(0, \Delta f)|^2 = |B|^2 \frac{2 - 2\cos(2\pi\gamma)}{4\sin^2\left(\frac{\pi\gamma}{N}\right)}$$

Afterwards, the value of $|R(l',\Delta f)|^2$ at the larger secondary peak $l'$ is calculated.

$$R(l', \Delta f) = AA^* e^{-j\frac{\pi l'(1+\mu')}{N}} e^{-j\frac{\pi\mu'(l'^2+l')}{N}} \sum_{n=0}^{N-1} e^{j\frac{2\pi n(\Delta f/f_{SCS}-\mu' l')}{N}}$$

$$|R(l', \Delta f)|^2 = |B|^2 \frac{2 - 2\cos(2\pi(\gamma - \mathrm{mod}(\mu' l', N)))}{4\sin^2\left(\frac{\pi(\gamma - \mathrm{mod}(\mu' l', N))}{N}\right)}$$

The possible value of $\mathrm{mod}(\mu'l',N)$ is 1 or −1, corresponding to the two secondary peaks next to the main peak. Since the larger secondary peak is selected, the value of $\mathrm{mod}(\mu'l', N)$ should be set such that it is larger in the above formula, that is, the value of $|\gamma-\mathrm{mod}(\mu'l',N)|$ is smaller. If $\gamma=0\sim0.5$, then $\mathrm{mod}(\mu'l',N)=1$; and if $\gamma=-0.5\sim0$ then $\mathrm{mod}(\mu'l', N)=-1$. Therefore, the positive or negative of the frequency offset can be judged through the positions of the main and secondary peaks.

Assuming $0<\gamma<0.5$, the ratio C of the main peak to the secondary peak is defined as:

$$C = \frac{|R(0, \Delta f)|}{|R(l', \Delta f)|} = \frac{\left|\sin\left(\frac{\pi(\gamma-1)}{N}\right)\right|}{\left|\sin\left(\frac{\pi\gamma}{N}\right)\right|}$$

Let $$\alpha = \frac{\pi\gamma}{N},$$

$$C = \frac{\left|\sin\left(\alpha - \frac{\pi}{N}\right)\right|}{|\sin(\alpha)|} = \frac{\sin\left(\alpha - \frac{\pi}{N}\right)}{\sin(\alpha)} = \frac{\cos\alpha\sin\left(\frac{\pi}{N}\right) - \sin\alpha\cos\left(\frac{\pi}{N}\right)}{\sin\alpha}$$

$$C\sin\alpha = \cos\alpha\sin\left(\frac{\pi}{N}\right) - \sin\alpha\cos\left(\frac{\pi}{N}\right)$$

$$\left(C + \cos\left(\frac{\pi}{N}\right)\right)\sin\alpha = \cos\alpha\sin\left(\frac{\pi}{N}\right)$$

$$\tan(\alpha) = \frac{\sin\left(\frac{\pi}{N}\right)}{C + \cos\left(\frac{\pi}{N}\right)}$$

then $$\gamma = \frac{N}{\pi}\mathrm{atan}\left(\frac{\sin\left(\frac{\pi}{N}\right)}{C + \cos\left(\frac{\pi}{N}\right)}\right)$$

In sub-step S1102, the first frequency offset is determined according to the ratio and the preset subcarrier interval.

In this embodiment, the first frequency offset can be calculated using the following formula:

$$\Delta \hat{f} = \gamma f_{SCS} = \frac{N}{\pi} \mathrm{atan}\left(\frac{\sin\left(\frac{\pi}{N}\right)}{C + \cos\left(\frac{\pi}{N}\right)}\right) f_{SCS}$$

wherein $\Delta \hat{f}$ is the first frequency offset, $f_{SCS}$ is the preset subcarrier interval, and C is the ratio.

In the above method provided by the embodiment of the present application, the first frequency offset is determined according to the ratio of the peak value of the main peak to the peak value of the secondary peak and the preset subcarrier interval, which can meet the application scenarios where the frequency offset is within one fold of the subcarrier interval, and also provide the basis for calculation for the estimation of the subsequent frequency offset of the integral folds of the subcarrier interval.

Figure 9:
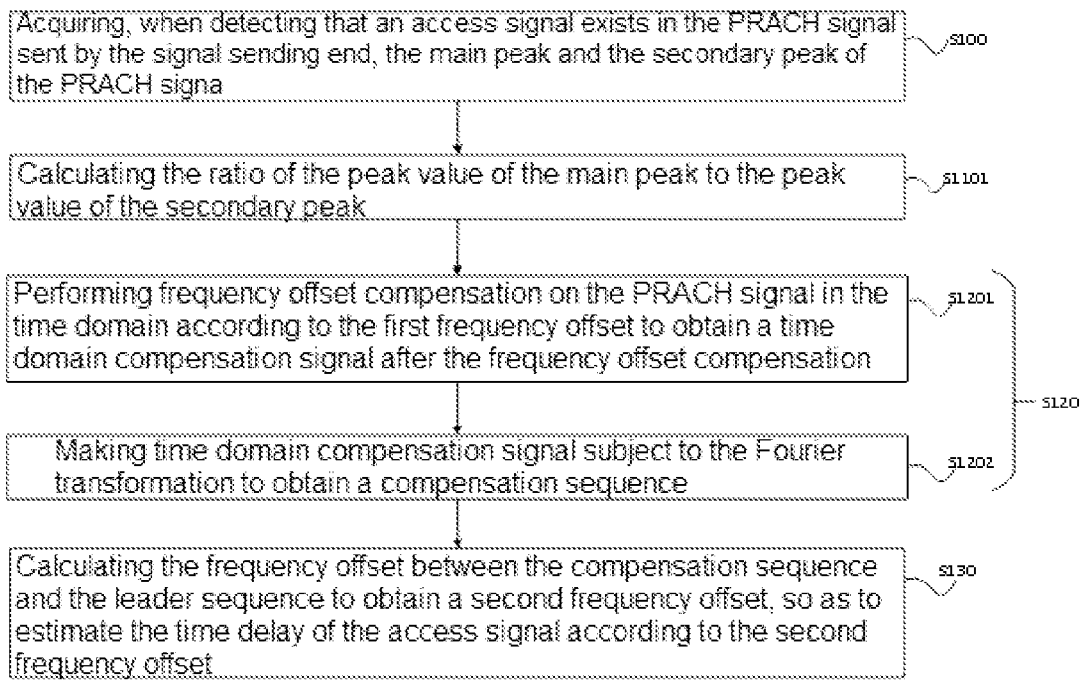
FIG. 9 is an exemplary diagram of a flow of a method for implementing the frequency offset compensation on a PRACH signal according to a first frequency offset, provided by an embodiment of the present application.

On the basis of FIG. 4, the embodiment of the present application also provides a specific implementation for performing the frequency offset compensation for the PRACH signal according to the first frequency offset. Referring to FIG. 9, FIG. 9 is an exemplary diagram of a flow of another frequency offset compensation method provided by the embodiment of the present application. Step S120 comprises the following sub-steps.

In sub-step S1201, the frequency offset compensation is performed on the PRACH signal in the time domain according to the first frequency offset to obtain a time domain compensation signal after the frequency offset compensation.

In this embodiment, the first frequency offset can be compensated in the time domain, and the time domain compensation signal can be obtained by the following formula:

$$r_{comp}(n) = r(n) \times e^{-j\frac{2\pi\Delta\hat{\varepsilon}_F n}{N}}$$

where $\Delta\hat{\varepsilon}_F = \Delta\hat{f}/f_{SCS}$.

In the sub-step S1202, the time domain compensation signal is subject to the Fourier transformation to obtain a compensation sequence.

In this embodiment, the time domain compensation signal is subject to the Fourier transformation such that the signal on the frequency domain subcarrier can be obtained, which is expressed by the following formula:

$$Y(k) = ZC_\mu(k - \Delta\varepsilon_I)$$

It should be noted that after the compensation sequence is obtained, as a specific implementation, Y(k) and the local frequency domain leader sequence can be used to perform the sliding correlation operation, and the second frequency offset can be obtained by using the following formula:

$$\mathcal{P}(l)\sum_{k=0}^{N-1} Y(k+l)ZC_\mu^*(k)$$

where $ZC_\mu^*$ means $ZC_\mu(k)$ conjugate, $\mathcal{P}(l)$ means the result of the sliding operation performed by Y(k) and $ZC_\mu^*(k)$, and the maximum value of $\mathcal{P}(l)$ is searched for, that is, an estimate of the integral folds of frequency offset can be obtained.

$$\hat{l} = \Delta\varepsilon_I$$

where $\Delta\varepsilon_I$ is the second frequency offset, and $\hat{l}$ is the value l when $\mathcal{P}(l)$ has the maximum value.

Since the integral folds of frequency offset does not have too much offset, it is enough that only a few values within a certain range need to be searched.

In the above method provided by the embodiment of the present application, the frequency offset compensation is performed for the obtained first frequency offset, which not only eliminates the influence of the first frequency offset on the access signal, but also eliminates the influence of the estimation on the subsequent frequency offset of integral folds of the subcarrier interval.

Figure 10:
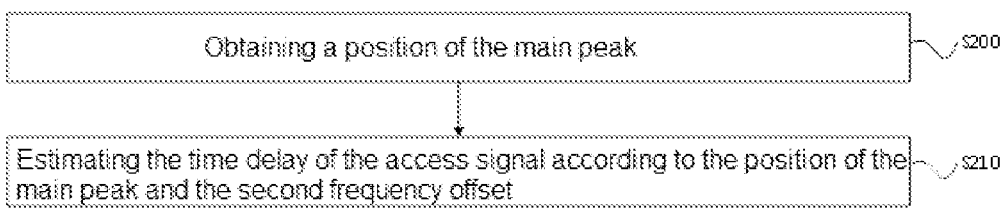
FIG. 10 is an exemplary diagram of a flow of a method for implementing the calculation of the time delay of an access signal, provided by an embodiment of the present application.

In the embodiment of the present application, in order to correctly locate the time delay of the access signal, the embodiment of the present application also provides an implementation for calculating the time delay of the access signal. Referring to FIG. 10, FIG. 10 is an exemplary diagram of a flow of a method for implementing the calculation of the time delay of an access signal, provided by to an embodiment of the present application. The method further comprises the following steps.

Step S200: obtaining a position of the main peak.

Step S210: estimating the time delay of the access signal according to the position of the main peak and the second frequency offset.

In this embodiment, the access signal is expressed as:

$$r(n) = e^{j\frac{2\pi\Delta\varepsilon n}{N}} \times Ae^{-j\frac{\pi n(1+\mu')}{N}} zc_{\mu'}(n-\kappa) + w(n)$$

wherein the correlation peak is expressed as:

$$R(m, \Delta f) = \sum_{n=0}^{N-1} r(n)s^*(n-m)$$

If there is no integral folds of frequency offset, the peak point in the above formula m^=κ, so the peak position m' that is searched out is the user time delay κ. If there is integral folds of frequency offset, the main peak point m' and the actual time delay point κ satisfy MOD($\mu'\hat{l}+\kappa$,N)=m', and through the above formula, the time delay position κ can be derived by calculation based on the main peak point m' and the number $\hat{l}$ of the folds in the integral folds of the frequency offset.

Figure 11:
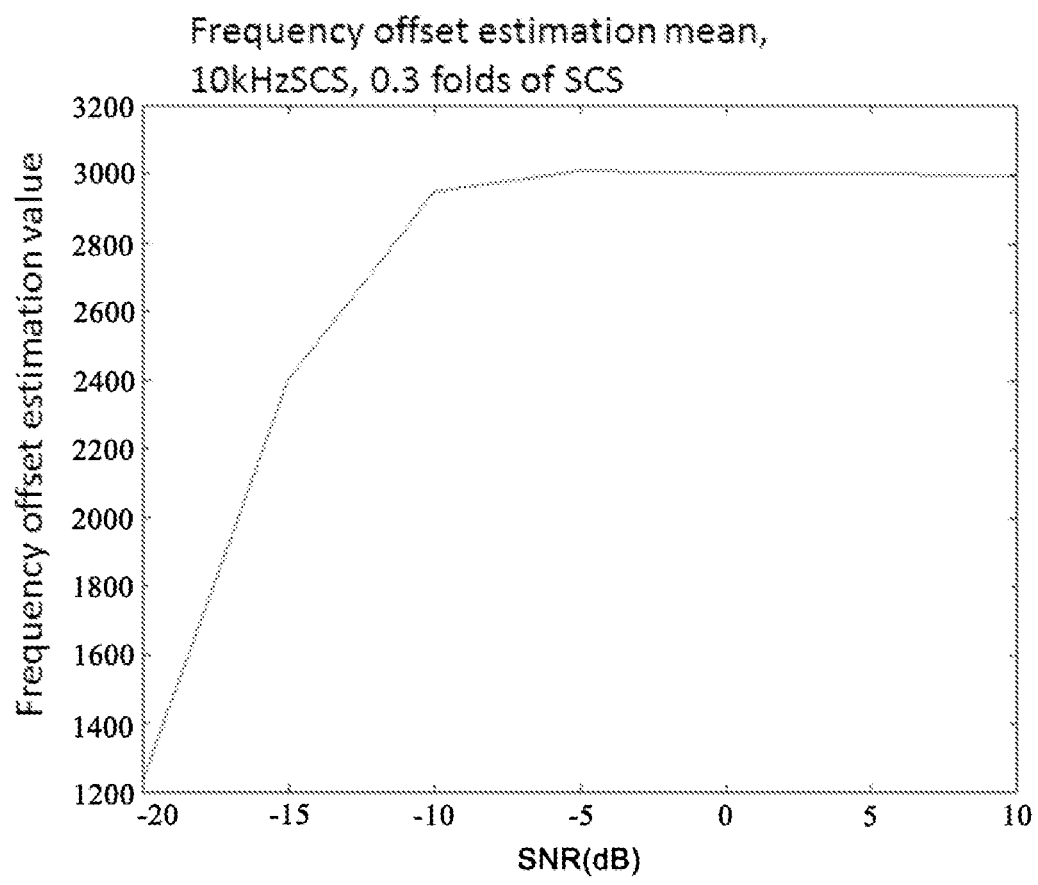
FIG. 11 is a simulation diagram of the performance of the frequency offset estimation provided by an embodiment of the present application.
Figure 12:
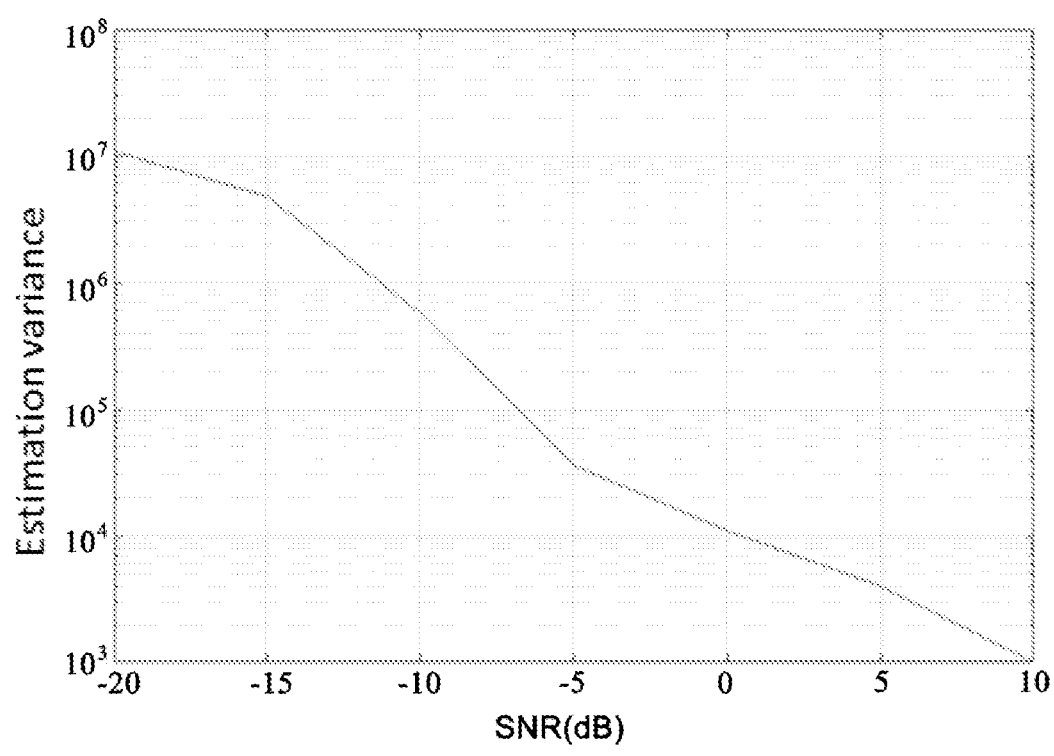
FIG. 12 is a simulation diagram of variance of the frequency offset estimation provided by an embodiment of the present application.

In order to more clearly illustrate the effect of the above-mentioned frequency offset estimation, in the embodiment of the present application, simulation and verification are performed. The simulation parameters are set as follows. Considering that the low-orbit satellite system adopts the Ka wave band, and the subcarrier interval of the PRACH channel is 10 kHz, the root value, μ, of the ZC sequence is 300 and the length is 839. In the simulation, the Doppler frequency offset of the PRACH signal is 1.3 folds of the subcarrier interval, and the true transmission position of the signal is 5. Using the above frequency offset estimation method, the performance simulation diagram of frequency offset estimation and the variance simulation diagram of frequency offset estimation are obtained. Referring to FIG. 11, FIG. 11 is a performance simulation diagram of frequency offset estimation provided by an embodiment of the present application. It can be seen from FIG. 11 that along with the signal-to-noise ratio increasing, the estimation performance is better and better, and a frequency offset of 0.3 folds can be correctly estimated. FIG. 12 is a variance simulation diagram of frequency offset estimation provided by an embodiment of the present application. It can be seen from FIG. 12 that along with the signal-to-noise ratio increasing, the estimation variance gradually decreases, indicating the effectiveness of the frequency offset estimation algorithm.

In this embodiment, in the simulation environment as described above, after the first frequency offset is obtained by estimation, frequency offset compensation is performed on the time domain signal, and then the Fourier transformation is performed to extract several different 839-point frequency domain value, near the frequency position of the sending signal. The correlation is performed with respect to the local reference ZC sequence, and the maximum value of the correlation peak is searched out, so as to obtain the position of the corresponding integral folds of frequency offset. Table 1 shows the simulation result of the frequency domain correlation value of the integral folds of frequency offset. It can be seen from Table 1 that the correlation peak value, which is obtained by performing correlation after the first frequency offset is compensated, is more obvious, and after the compensation, the error of frequency domain value at the correct position is smaller. The compensation algorithm can overcome the influence of the fractional folds of frequency offset on the frequency domain search, and the correlation search can search for the integral folds of frequency offset according to the situation, with the folds in the any number, so that the estimation algorithm is no longer restricted by the frequency offset range.

TABLE 1

|  | Relative index of searched integral folds of frequency offset | | |
| --- | --- | --- | --- |
|  | −1 | 0 | 1 |
| Correlation value (with fractional frequency offset compensation) | 19.51 | 816.36 | 14.36 |
| Correlation value (without fractional frequency offset compensation) | 205.58 | 697.50 | 309.63 |

Figure 13:
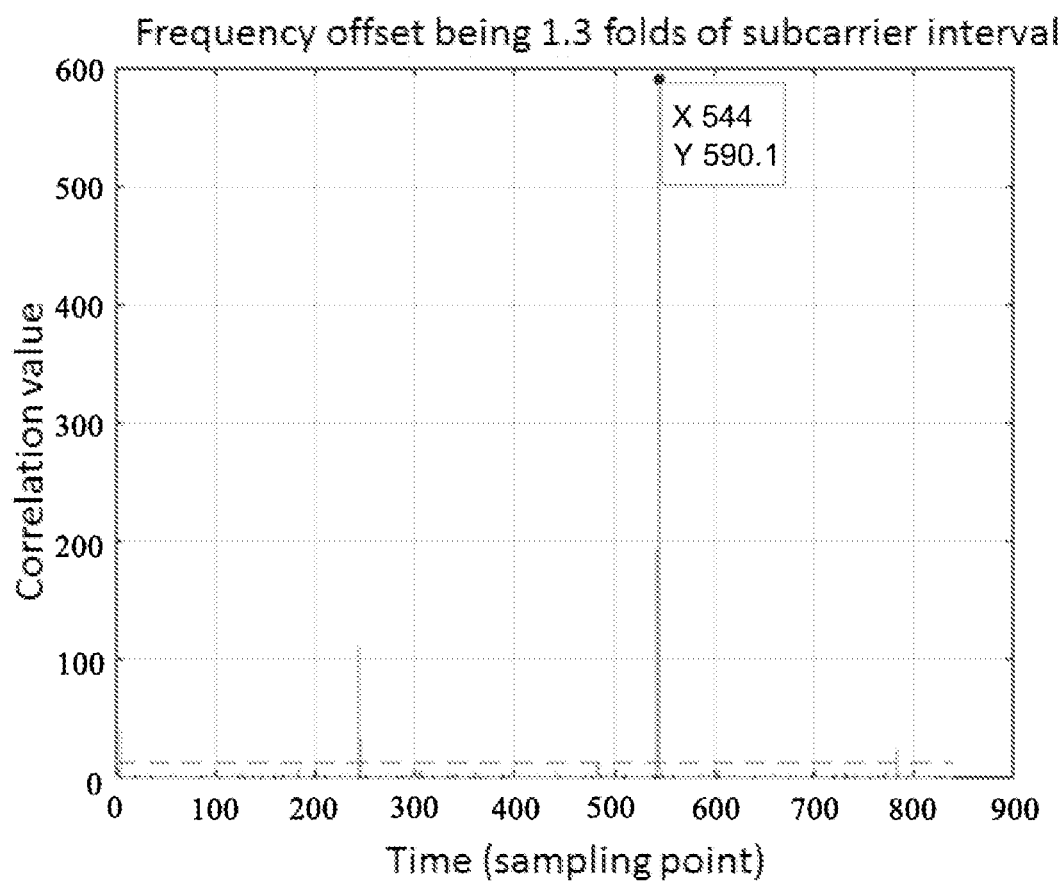
FIG. 13 is an exemplary diagram of a correlation peak result of the signal detection on a frequency offset of folds in number greater than an integer, provided by an embodiment of the present application.

In the above simulation environment, FIG. 13 shows an exemplary diagram of a correlation peak result of the signal detection on a frequency offset of folds in number greater than an integer, in that simulation environment. Due to the existence of the integral folds of frequency offset (i.e., the second frequency offset), the main peak of the spectral peaks is caused to be shifted to the 544 position, which differs from the actual sending position of the signal by 300, which is equal to the p value, being consistent with the theoretical derivation. Secondly, due to the existence of the fractional folds of frequency offset (i.e., the first frequency offset), a secondary peak appears in the correlation peaks. The secondary peak is at the position of 244, which differs from the main peak by 300 as well. At the same time, the size of the secondary peak is related to the size of the fractional folds of frequency offset. The larger the frequency offset is, the higher the secondary peak is. From the position of the correlation peak in FIG. 13, it can be seen that due to the influence of the integral folds of frequency offset, the position of the main peak of the correlation peak has shifted from 5 to 544, with an offset interval of 300, which corresponds to one fold of subcarrier frequency offset.

Using the frequency offset estimation method described in the embodiment of the present application, the main peak position 544 is first obtained, then estimation of the fractional folds of frequency offset is performed, and after the fractional folds of frequency offset is compensated in the time domain, the estimation of the integral folds of frequency offset is performed to obtain the estimation value of integral folds, one fold, and then it moves on the correlation peak by 300 points corresponding to 1 fold of the frequency offset, and the spectrum peak can be compensated from 544 back to the actual value of 5, so that the position of sending point of the access signal is 5, which is the time delay estimation value.

Figure 14:
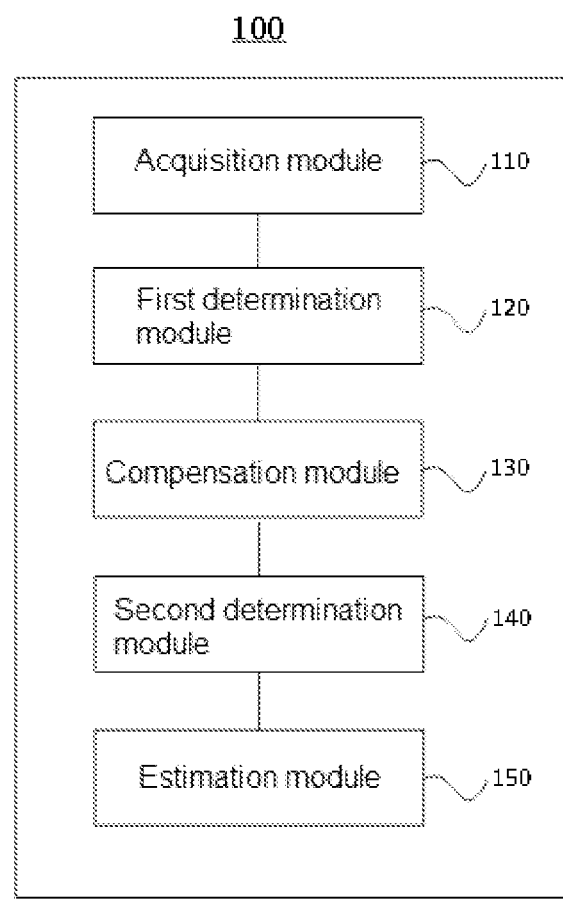
FIG. 14 is a schematic block diagram of a frequency offset estimation device provided by an embodiment of the present application.

In order to perform the corresponding steps of the above-mentioned embodiments and individual possible embodiments applicable to the signal sending end, an implementation of the frequency offset estimation device 100 is provided below. Referring to FIG. 14, FIG. 14 shows a schematic block diagram of a frequency offset estimation device 100 provided by an embodiment of the present application. The frequency offset estimation device 100 is applicable to the signal receiving end. It should be noted that the basic principle and the technical effects of the frequency offset estimation device 100 provided in this embodiment are the same as those in the above embodiments. For a brief description, some parts are not mentioned and pointed out in this embodiment.

The frequency offset estimation device 100 includes an acquisition module 110 a first determination module 120, a compensation module 130, a second determination module 140, and an estimation module 150.

The acquisition module 110 is configured to: acquire a main peak and a secondary peak of a PRACH signal when detecting that an access signal is in the PRACH signal sent by the signal sending end, wherein the PRACH signal is composed of a preset number of identical leader sequences.

The first determination module 120 is configured to determine a first frequency offset according to a peak value of the main peak and a peak value of the secondary peak.

As a specific embodiment, the first determination module 120 is specifically configured to: calculate a ratio of a peak value of the main peak to a peak value of the secondary peak and determine a first frequency offset according to the ratio and a preset subcarrier interval.

A compensation module 130 is configured to perform a frequency offset compensation on the PRACH signal according to the first frequency offset, to obtain a compensation sequence after the frequency offset compensation.

As a specific embodiment, the compensation module 130 is specifically configured to: perform a frequency offset compensation on the PRACH signal in the time domain according to the first frequency offset to obtain a time domain compensation signal after the frequency offset compensation; and perform Fourier transformation on the time domain compensation signal to obtain the compensation sequence.

A second determination module 140 is configured to: calculate a frequency offset between the compensation sequence and the leader sequences to obtain a second frequency offset, so as to estimate a time delay of the access signal according to the second frequency offset.

The estimation module 150 is configured to: obtain the position of the main peak; and estimate the time delay of the access signal according to the position of the main peak and the second frequency offset.

Figure 15:
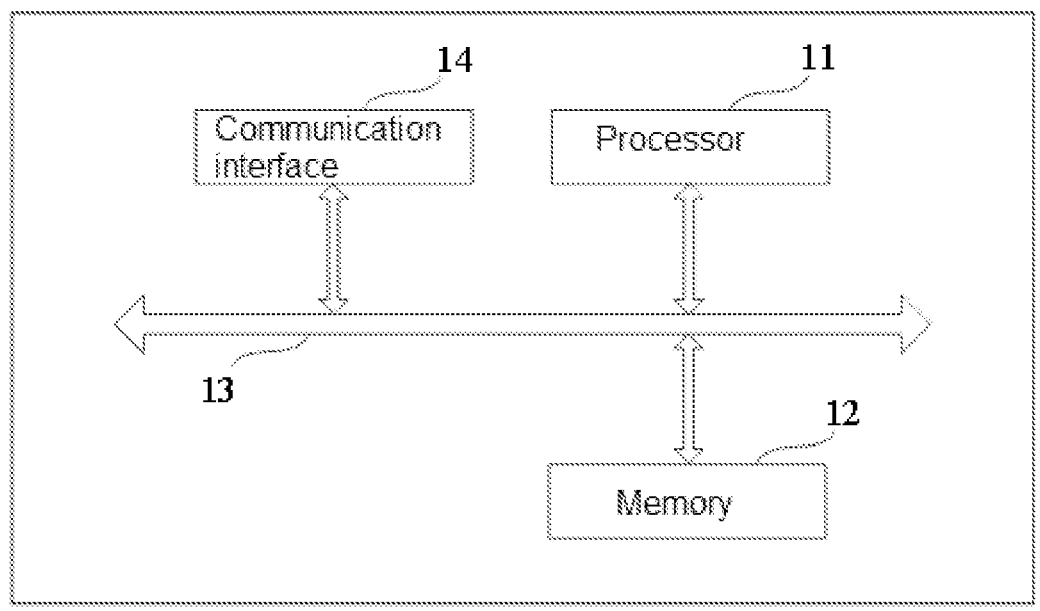
FIG. 15 is a schematic block diagram of a communication device provided by an embodiment of the present application.

The embodiment of the present invention also provides a schematic block diagram of a communication device 10 that can execute the above frequency offset estimation method. Referring to FIG. 15, FIG. 15 is a schematic block diagram of a communication device 10 provided by an embodiment of the present application. The communication device 10 includes a processor 11, a memory 12, a bus 13, and a communication interface 14, The processor 11 and the memory 12 are connected with each other through a bus 13, and the processor 11 communicates with external devices through the communication interface 14.

The processor 11 may be an integrated circuit chip with signal processing capabilities, During the implementation process, the individual steps of the above method can be completed by an integrated logic circuit of hardware or instructions in the form of software in the processor 11. The above-mentioned processor 11 may be a general-purpose processor, including a central processing unit (CPU for short), a network processor (NP for short), etc.; and it may also be a digital signal processor (DSP) or a specific integrated circuit (ASIC), field programmable gate array (FPGA) or other programmable logic devices, discrete gates or transistor logic devices, discrete hardware components.

The memory 12 is used to store programs, for example, the frequency offset estimation device 100 in the embodiments of the present invention, the frequency offset estimation device 100 includes at least one software function module that can be stored in the memory 12 in the form of software or firmware. The processor 11, after receiving the execution instructions, executes the programs to implement the frequency offset estimation method in the embodiment of the present invention.

The memory 12 may include a high-speed random access memory (RAM), or may also include a non-volatile memory. Optionally, the memory 12 may be a storage device built in the processor 11 or a storage device independent of the processor 11.

The bus 13 may be an ISA bus, a PCI bus, an EISA bus, or the like. In FIG. 15, it is only represented by a two-way arrow, which however does not mean that there is only one bus or one type of bus.

An embodiment of the present invention provides a computer-readable storage medium on which computer programs are stored. When the computer programs are executed by a processor, the above-mentioned frequency offset estimation method is implemented.

In summary, the embodiments of the present invention provide a frequency offset estimation method, device, communication device, and storage medium, which are applicable to a signal receiving end. The signal receiving end is in communication with a signal sending end. The method includes: acquiring a main peak and a secondary peak of a PRACH signal when detecting that an access signal is in the PRACH signal sent by the signal sending end, wherein the PRACH signal is composed of a preset number of identical leader sequences; determining a first frequency offset according to a peak value of the main peak and a peak value of the secondary peak; performing a frequency offset compensation on the PRACH signal according to the first frequency offset, to obtain a compensation sequence after the frequency offset compensation; and calculating a frequency offset between the compensation sequence and the leader sequences, to obtain a second frequency offset, so as to estimate a time delay of the access signal according to the second frequency offset. Compared with the prior art, by means of firstly determining the first frequency offset according to the peak value of the main peak and the peak value of the secondary peak, and then performing the frequency offset compensation on the received PRACH signal according to the first frequency offset to obtain the compensation sequence, and finally calculating the frequency offset between the compensation sequence and the leader sequence to obtain the second frequency offset, the present application achieves that the frequency offsets of any size can all be accurately estimated, so as to estimate the time delay according to the frequency offset estimation results, which expands the scope of application scenarios.

The above are only specific embodiments of the present invention, but the protection scope of the present invention is not limited to it. Any person skilled in the art can easily think of changes or substitutions within the technical scope disclosed by the present invention. All of them should be covered within the protection scope of the present invention. Therefore, the protection scope of the present invention should be subject to the protection scope of the claims.

What is claimed is:

1. A frequency offset estimation method, applicable to a signal receiving end, wherein the signal receiving end is in communication with a signal sending end, and the method comprises steps of;

acquiring a main peak and a secondary peak of a PRACH signal when detecting that an access signal is in the PRACH signal sent by the signal sending end, wherein the PRACH signal is composed of a preset number of identical leader sequences;

calculating a ratio of a peak value of the main peak to a peak value of the secondary peak;

determining a first frequency offset according to the ratio and a preset subcarrier interval;

performing a frequency offset compensation on the PRACH signal according to the first frequency offset, to obtain a compensation sequence after the frequency offset compensation;

calculating a frequency offset between the compensation sequence and the leader sequences, to obtain a second frequency offset, so as to estimate a time delay of the access signal according to the second frequency offset;

acquiring a position of the main peak;

estimating a time delay of the access signal according to the position of the main peak and the second frequency offset, wherein according to a main peak point m' and a number $\hat{1}$ of folds in integral folds of the frequency offset, a time delay position k is derived by calculation using a following formula, the access signal is expressed as:

$$r(n) = e^{j\frac{2\pi\Delta\varepsilon n}{N}} \times Ae^{-j\frac{\pi n(1+\mu')}{N}} zc_{\mu'}(n-\kappa) + w(n)$$

a correlation peak is expressed as:

$$R(m, \Delta f) = \sum_{n=0}^{N-1} r(n)s^*(n-m)$$

wherein if the number of folds of the frequency offset is not an integer, the peak point of the above formula m'=k, and the searched peak position m' is a user time delay k; and if the number of folds of the frequency offset is an integer, the main peak point m' and an actual time delay point k satisfy MOD($\mu'\hat{1}+\kappa$,N)=m', wherein r(n) is the access signal, $\Delta\varepsilon$ is a frequency offset of the signal, $\Delta\varepsilon=\Delta f/f_s$, $f_s$ is a sampling rate, $\Delta f$ is a frequency offset, $$A = \frac{1}{\sqrt{N}}\left[\sum_{k=0}^{N-1} ZC_\mu(k)\right],$$

w(n) is noise with a mean value of 0 and a variance of a $\sigma^2$, μ is a root value, k represents an index value of a ZC sequence, N represents a length of a time domain sequence, n represents an index of the time domain sequence, and μ' is dual to the root value$^μ$.

2. The frequency offset estimation method according to claim 1, wherein the step of performing a frequency offset compensation on the PRACH signal according to the first frequency offset to obtain a compensation sequence after the frequency offset compensation comprises:
   performing a frequency offset compensation on the PRACH signal n the time domain according to the first frequency offset to obtain a time domain compensation signal after the frequency offset compensation; and
   performing Fourier transformation on the time domain compensation signal to obtain the compensation sequence.

3. A communication device, comprising a memory and a processor, wherein the memory stores computer programs, and the processor implements the frequency offset estimation method according to claim 1 when executing the computer programs.

4. The communication device according to claim 3, wherein the step of performing a frequency offset compensation on the PRACH signal according to the first frequency offset to obtain a compensation sequence after the frequency offset compensation comprises:
   performing a frequency offset compensation on the PRACH signal in the time domain according to the first frequency offset to obtain a time domain compensation signal after the frequency offset compensation; and
   performing Fourier transformation on the time domain compensation signal to obtain the compensation sequence.

5. A frequency offset estimation device, applicable to a signal receiving end, wherein the signal receiving end is in communication with a signal sending end, and the device comprises:
   an acquisition module, configured to acquire a main peak and a secondary peak of a PRACH signal when detecting that an access signal is in the PRACH signal sent by the signal sending end, wherein the PRACH signal is composed of a preset number of identical leader sequences;
   a first determination module, configured to calculate a ratio of a peak value of the main peak to a peak value of the secondary peak and determine a first frequency offset according to the ratio and a preset subcarrier interval;
   a compensation module, configured to perform a frequency offset compensation on the PRACH signal according to the first frequency offset, to obtain a compensation sequence after the frequency offset compensation;
   a second determination module, configured to calculate a frequency offset between the compensation sequence and the leader sequences, to obtain a second frequency offset, so as to estimate a time delay of the access signal according to the second frequency offset; and
   an estimation module configured to acquire a position of the main peak, and estimate a time delay of the access signal according to the position of the main peak and the second frequency offset, wherein
   according to a main peak point m' and a number $\hat{l}$ of folds in integral folds of the frequency offset, a time delay position k is derived by calculation using a following formula, the access signal is expressed as:

$$r(n) = e^{j\frac{2\pi\Delta\varepsilon n}{N}} \times Ae^{-j\frac{\pi n(1+\mu')}{N}} zc_{\mu'}(n-\kappa) + w(n)$$

a correlation peak is expressed as:

$$R(m, \Delta f) = \sum_{n=0}^{N-1} r(n)s^*(n-m)$$

wherein if the number of folds of the frequency offset is not an integer, the peak point of the above formula m'=k, and the searched peak position m' is a user time delay k; and if the number of folds of the frequency offset is an integer; the main peak point m' and an actual time delay point k satisfy MOD(μ'$\hat{l}$+κ,N)=m';
wherein r(n) is the access signal, Δε is a frequency offset of the signal, Δε=Δf/f$_s$, f$_s$ is a sampling rate, Δf is a frequency offset, $$A = \frac{1}{\sqrt{N}}\left[\sum_{k=0}^{N-1} ZC_\mu(k)\right],$$

w(n) is noise with a mean value of 0 and a variance of $\sigma^2$, μ is a root value, k represents an index value of a ZC sequence, N represents a length of a time domain sequence, n represents an index of the time domain sequence, and μ' is dual to the root value μ.

6. The frequency offset estimation device of claim 5, wherein the compensation module is configured to:
   perform a frequency offset compensation on the PRACH signal in the time domain according to the first frequency offset to obtain a time domain compensation signal after the frequency offset compensation; and
   perform Fourier transformation on the time domain compensation signal to obtain the compensation sequence.

* * * * *